A. C. MINER.
TROLLEY HARP CARRIER.
APPLICATION FILED DEC. 24, 1914.
1,137,271.
Patented Apr. 27, 1915.
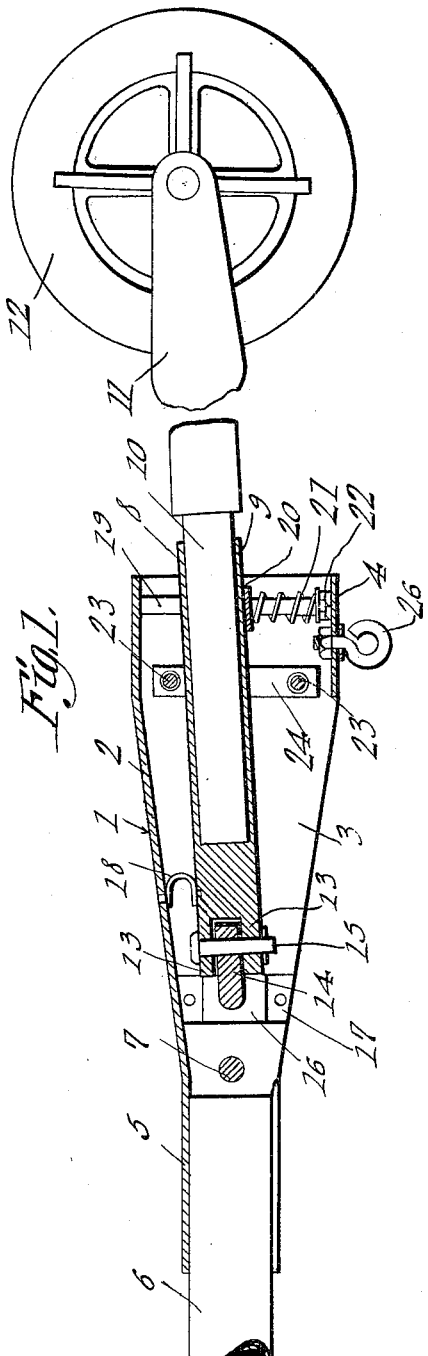
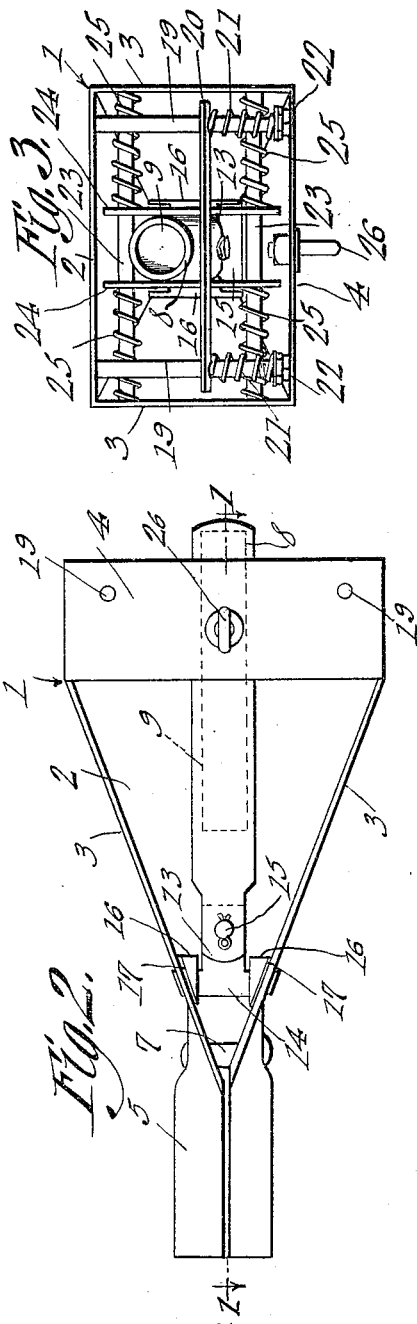

UNITED STATES PATENT OFFICE.

ALFRED C. MINER, OF MISSOULA, MONTANA.

TROLLEY-HARP CARRIER.

1,137,271.  Specification of Letters Patent.  Patented Apr. 27, 1915.

Application filed December 24, 1914. Serial No. 878,894.

*To all whom it may concern:*

Be it known that I, ALFRED C. MINER, a citizen of the United States, residing at Missoula, in the county of Missoula and State of Montana, have invented a new and useful Trolley-Harp Carrier, of which the following is a specification.

The present invention appertains to a trolley harp carrier applicable to the free end of a trolley pole, and having novel means for supporting the trolley harp for movement relative to the pole, in order that the trolley wheel may be held constantly and effectively in contact with the trolley wire.

It is the object of this invention, to provide a trolley harp carrier of novel construction, whereby it will efficiently fulfil its office, to hold the trolley wheel in proper contact with the trolley wire at all times, and to prevent the trolley wheel jumping from the trolley wire. It is also within the scope of the invention, to provide a device of the nature indicated, the construction of which is comparatively simple, non-encumbering and inexpensive, as well as being improved generally, so as to enhance the utility of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:—

Figure 1 is a longitudinal section of the present device, taken on the line 1—1 of Fig. 2, illustrating the device applied to the end of the trolley pole, and the harp applied to the device. Fig. 2 is a bottom view of the present device. Fig. 3 is an end view thereof.

In carrying out the invention, the trolley harp carrier embodies a casing or hollow body 1 comprising a triangular top 2, diverging sides 3, and a cross piece 4 between the sides 3 at the widest end of the casing 1, the bottom of the casing or body having an opening for enabling rain, snow and other foreign matter entering the casing, to pass therefrom through the bottom of the casing, to prevent the parts being clogged or otherwise impaired. The casing 1 tapers from that end having the cross piece 4, or is of flared construction with an enlarged mouth at that end having the cross piece 4, and the smallest end of the casing 1 which is remote from the cross piece 4, is provided with a longitudinally projecting split sleeve 5 which is adapted to be slipped over the upper or free end of an ordinary trolley pole 6. The sleeve 5 is preferably split, with the slot thereof disposed lowermost, it being noted that the casing may be fashioned from a sheet metal blank, if desired, although it may be in the form of a casting, or constructed in any other suitable manner. A transverse rivet 7 is preferably engaged through the sides 3 of the casing 1 adjacent the sleeve 5, for rendering the casing and the sleeve 5 substantial.

Disposed within the casing 1 is an elongated socket member 8, having the socket or bore 9 for receiving the shank 10 of the trolley harp 11 which carries the trolley wheel 12, and the socket member 8 is mounted for movement within the casing 1, so as to enable the harp 11 to move vertically and laterally relative to the trolley pole. Thus, the inner end of the socket member 8 is provided with upper and lower ears 13 projecting therefrom, which straddle the body portion of a T-shaped member 14. The body portion of the member 14 projects toward the mouth of the casing 1, and the ears 13 are pivoted to the body portion of the member 14, by means of a pivot pin 15, which allows the socket member 8 to oscillate or vibrate laterally. The head of the member 14 is disposed transversely and its arms are journaled through bearings 16 disposed within the casing 1 and secured to the sides 3 thereof adjacent the sleeve 5 and rivet 7. The bearings 16 are provided with flanges or ears 17 riveted or otherwise secured to the sides 3 of the casing 1, and the arms of the head 14 are also preferably, although not necessarily, journaled through the sides 3 of the casing. The body portion of the member 14 is thus free to swing vertically, or about a transverse or horizontal axis, and the socket member 8 being carried by the body portion of the member 14, will enable the socket member 8 to oscillate or swing vertically, as well as laterally.

A curved strip or spring 18 is terminally secured to the top 2 of the casing 1 and the upper surface of the socket member 8 adjacent the pivot of the said socket member, and the strip or spring 18 serves as a flexible connection between the socket member 8 and casing 1 to electrically connect them, to reduce the liability of the electric circuit being broken between the pole and harp, due to the trolley wheel striking the suspension points of the trolley wire or other inequalities in the trolley wire. The strip or spring 18 will thus properly conduct the electrical energy between the pole and harp at all times, and may flex when the socket member 8 swings within the casing 1, so as not to impair the operation of the present device.

As a means for yieldably holding the member or arm 8 and harp 11 carried thereby at a neutral or normal position with respect to the casing 1 and pole 6, a pair of upright rods 19 is terminally secured through the top 2 and cross piece 4 of the casing adjacent the sides thereof and within the mouth portion of the casing, and a spring raised transverse bar 20 has its end portions slidably embracing the rods 19. The member 8 is seated upon the bar 20 and is adapted to swing laterally thereon, and coiled wire expansion springs 21 are disposed upon the rods 19 below the bar 20 to yieldably support the said bar, so that the bar 20 will normally hold the member 8 raised. The springs 21 are seated upon adjusting nuts 22 threaded upon the lower end portions of the rods 19, whereby the tension of the springs 21 may be regulated by adjusting the nuts 22. A pair of upper and lower horizontal or transverse rods 23 are terminally engaged through the sides 3 of the casing 1 adjacent the rods 19, and a pair of upright bars 24 have their terminal portions slidably engaging the rods 23. The bars 24 are adapted to bear against opposite sides of the member 8, and are spring pressed, by means of coiled wire expansion springs 25 disposed upon the rods 23 between the bars 24 and the sides 3 of the casing. The springs 25 at the opposite sides balance one another, to hold the member 8 at an intermediate or central position between the sides of the casing, under normal conditions. It will thus be noted that the bar or slide 20 supports the member 8, while the spring pressed bars or slides 24 hold the said member yieldably at normal position.

An eye bolt 26 is engaged to the cross piece 4 for the attachment of the trolley rope (not shown), whereby the trolley pole may be lowered and otherwise manipulated when necessary.

In operation, the spring raised bar or slide 20 which supports the member 8, normally holds the harp 11 raised relative to the casing 1 and pole 6, and allows the harp to swing downwardly against the tension of the springs 21, when the trolley wheel strikes the suspension points or other irregularities in the trolley wire. Thus, the harp and pole may vibrate relative to one another, which will reduce the liability of the trolley wheel jumping away from the trolley wire. In this manner, the trolley wheel is constantly or steadily held in contact with the trolley wire.

The member or arm 8 may swing transversely within the casing 1, so as to allow the harp to move toward one side or the other of the axis of the pole 6, as when the street car or other electrically propelled vehicle to which the device is applied, is rounding a curve. When the member 8 is swung toward one side it will move the respective bar or slide 24 therewith against the corresponding springs 25, the said springs being brought under greater tension, serving to return the member 8 to normal position as soon as the lateral strain or pressure is removed from the harp.

The present device will allow a limited movement of the harp and trolley wheel carried thereby with respect to the pole, to enable the trolley wheel to constantly engage the trolley wire, and to enable the trolley wheel to readily work along bends in the trolley wire. The present device will also reduce to a minimum, the noise incident to the trolley wheel striking bands, ears or other obstructions upon the trolley wire. This device will also decrease the wear of the trolley wheel and wire, to increase the life thereof, and arcing is prevented, to avoid the loss of power and current.

Having thus described the invention, what is claimed as new is:—

1. In a device of the class described, a casing, a T-shaped member having its arms journaled within the casing, a member pivoted to the body portion of the said T-shaped member, and yieldable means within the casing for holding the second mentioned member at a normal position.

2. In a device of the character described, a casing, an arm pivotally mounted therein to swing vertically and laterally relative thereto, balanced yieldable means between the said member and sides of the casing to hold the said member at an intermediate position between the sides of the casing, and yieldable means for swinging the said member and casing vertically relative to one another.

3. In a device of the character described, a casing, a member pivotally mounted therein to swing vertically and laterally, a vertically movable spring pressed slide mounted within the casing, the said member bearing against the slide and being swingable along the same, and spring means disposed between the said member and sides of the casing for normally holding the said member at an intermediate position.

4. In a device of the character described, a casing, a member pivotally mounted therein, a pair of upright rods mounted within the casing, a transverse bar slidable upon the said rods, springs mounted upon the said rods and coöperating with the said bar, the said member bearing against the bar and being movable therealong, and yieldable means betwen the said member and casing for holding said member normally at an intermediate position.

5. In a device of the character described, a casing, a member pivotally mounted therein, transverse rods mounted within the casing, slides mounted upon the said rods and bearing against the opposite sides of the said member, balanced springs disposed upon the said rods between the slides and casing for holding the said member normally at an intermediate position, and yieldable means for moving the casing and said member vertically relatively to one another.

In testimony that I claim the foregoing as my own, I have hereto affixed my signature in the presence of two witnesses.

ALFRED C. MINER.

Witnesses:
WALTER M. BICKFORD,
ZELMA NASH.

Copies of this patent may be obtained for five cents each, by addressing the "Commissioner of Patents, Washington, D. C."